US012601633B2

(12) United States Patent
Moghbeli et al.

(10) Patent No.: US 12,601,633 B2
(45) Date of Patent: Apr. 14, 2026

(54) MODIFIED RECTANGULAR WAVE POLARIZATION CONTROL (MRWPC) SYSTEM

(71) Applicants:Omidreza Moghbeli, Rancho Cucamonga, CA (US); Ian Budner, La Verne, CA (US); Madjid Pahlevany, Tehran (IR); Sebastian Borucki, Corona, CA (US)

(72) Inventors: Omidreza Moghbeli, Rancho Cucamonga, CA (US); Ian Budner, La Verne, CA (US); Madjid Pahlevany, Tehran (IR); Sebastian Borucki, Corona, CA (US)

( * ) Notice: Subject to any disclaimer, the term of this patent is extended or adjusted under 35 U.S.C. 154(b) by 968 days.

(21) Appl. No.: 17/836,696

(22) Filed: Jun. 9, 2022

(65) Prior Publication Data

US 2022/0397459 A1 Dec. 15, 2022

Related U.S. Application Data

(60) Provisional application No. 63/209,287, filed on Jun. 10, 2021.

(51) Int. Cl.
*C25B 15/02* (2021.01)
*G01J 4/04* (2006.01)

(52) U.S. Cl.
CPC ..................................... *G01J 4/04* (2013.01)

(58) Field of Classification Search
CPC .................................. G01J 4/04; C25B 15/02
See application file for complete search history.

(56) References Cited

U.S. PATENT DOCUMENTS

| | | | |
|---|---|---|---|
| 3,975,254 A | 8/1976 | Elco | |
| 4,447,696 A * | 5/1984 | Niwa | B23H 1/022 |
| | | | 219/69.18 |
| 2021/0204839 A1* | 7/2021 | Abdolahad | G01N 27/3278 |

FOREIGN PATENT DOCUMENTS

| | | |
|---|---|---|
| CN | 2464002 Y | 12/2000 |
| EP | 1475463 B2 | 12/2003 |

* cited by examiner

*Primary Examiner* — Zulmariam Mendez

(57) ABSTRACT

A Modified Rectangular Wave Polarization Control (MRWPC) system generates an automatically adjustable rectangular wave to optimize polarization of electrodes in relative electrolytes by decreasing the concentration polarization effect. The MRWPC system provides corrosion mitigation for metallic structures in corrosive environments, battery rejuvenation/rapid charging, enhancements in the electroplating process, and other procedures that utilize electrochemical reactions.

14 Claims, 4 Drawing Sheets

Concentration Polarization Self-Adjustment Schematic

MODIFIED RECTANGULAR WAVE POLARIZATION CONTROL (MRWPC) SYSTEM

CROSS-REFERENCE TO RELATED APPLICATIONS

The present application claims the priority of U.S. Provisional Patent Application Ser. No. 63/209,287 filed Jun. 10, 2021, which application is incorporated in its entirety herein by reference.

BACKGROUND OF THE INVENTION

The present invention relates generally to a system and apparatus for Modified Rectangular Wave Polarization Control (MRWPC) system which applies to: corrosion mitigation for metallic structures in corrosive environments; battery rejuvenation and rapid charging; and enhanced electroplating/electroforming.

Corrosion protection systems, batteries, and electroplating processes are all functioning due to the occurrence of several electrochemical reactions and all include anodes, cathodes, and electrolytes. Polarization phenomena has a major effect on the kinetics of each reaction. These all utilize Direct Current (DC) as the source of energy between the anode and cathode when needed to advance the required electrochemical reactions. As reactions progress, the polarization and de-polarization phenomena takes place on the surface of anodes and cathodes collectively known as electrodes in contact with an electrolyte. As polarization phenomena occurs the rate and energy requirements of reactions will depend on it and becomes the major factor controlling the reactions. Polarization has positive and negative effects depending on the type of reactions in different applications.

One of the main techniques of corrosion control for metallic structures is the application of Cathodic Protection (CP) systems. This method is based on cathodic polarization of metallic structures utilizing DC. Introducing DC into the cathode (structure in corrosion protection systems, negative battery components, and/or subject object in electroplating) and anode (anodes in corrosion protection systems, positive battery components, and/or plating metal in electroplating), results in cathodic/anodic polarization. Polarizing cathodes will protect subject metallic structures, has a major role in the charging process of re-chargeable batteries, and triggers electroplating by attachment of the plating metal to the subject object.

BRIEF SUMMARY OF THE INVENTION

The present invention addresses the above and other needs by providing a Modified Rectangular Wave Polarization Control (MRWPC) system. The main difference between conventional DC applications and the MRWPC system is how energy is applied to the electrodes. Conventional DC systems utilize a continuous injection of DC, while this innovative method switches DC polarity between the electrodes utilizing an adjustable frequency with an adjustable voltage. The MRWPC system addresses corrosion mitigation for metallic structures in corrosive environments, battery rejuvenation/rapid charging, enhancements in the electroplating process, and other procedures that utilize polarization of metallic electrodes.

In accordance with one aspect of the invention, there is provided an MRWPC system which generates an adjustable rectangular wave to optimize polarization of electrodes in relative electrolytes by decreasing the concentration polarization effect.

In accordance with one aspect of the invention, there is provided an MRWPC system which reducing or eliminating the interface resistance of the electrodes to their respective electrolytes. Therefore, the MRWPC system reduces energy consumption associated with corrosion protection, battery charging, and electroplating.

In accordance with another aspect of the invention, there is provided an MRWPC system which reduces the time required to polarize/de-polarize the surface of the electrodes in order to facilitate or prevent the electro chemical reactions based on the application.

In accordance with yet another aspect of the invention, there is provided an MRWPC system which improves the mass transfer by continuously reversing the polarity of the electrodes, thereby increasing the range for corrosion protection systems, easing the electroplating process for complex shapes, and enabling rejuvenation of passivated batteries.

In accordance with still another aspect of the invention, there is provided an MRWPC system which reduces electrical resistance of the whole system due to the lack of formation of a diffusion layer (concentration polarization) on both electrodes; eliminates the possibility of overprotection of structures in the corrosion industry; and reduces energy consumption.

In accordance with another aspect of the invention, there is provided an MRWPC system which reduces enhances the corrosion protection, battery rejuvenation, and electroplating process with increased efficiency and without generating any stray current in corrosion protection and/or waste of energy in battery charging and electroplating/electroforming process due to reduced resistance on the anode/cathode surfaces; reduces time required for battery charging and electroplating; and rejuvenates passivated batteries.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
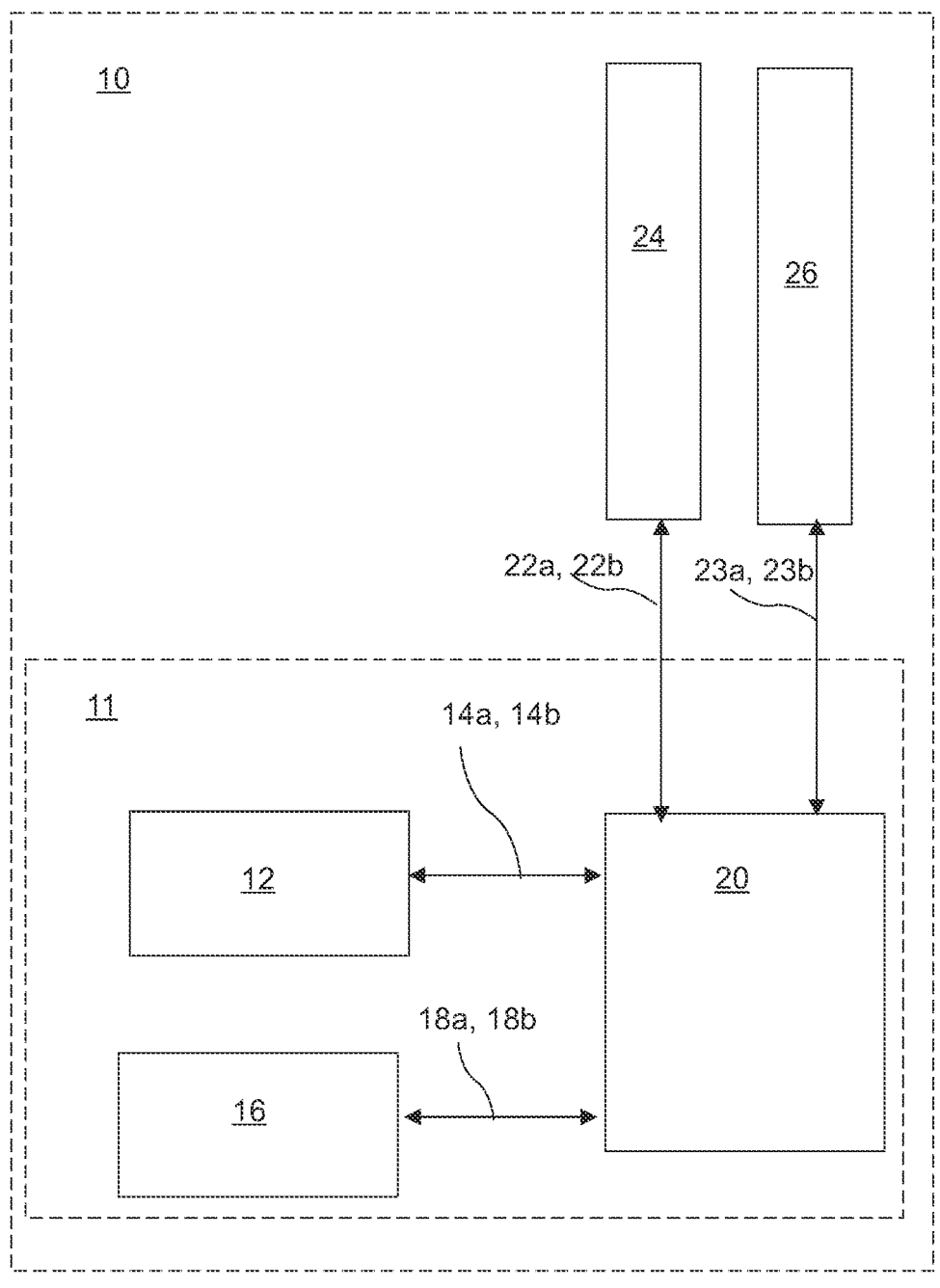
FIG. 1 shows a Modified Rectangular Wave Polarization Control (MRWPC) system including variable forward and reverse power supplies and a time switching controller which operate together as one unit to generate rectangular power, according to the present invention.

The present invention is a Modified Rectangular Wave Polarization Control (MRWPC) system 10 shown in FIG. 1. The MRWPC system 10 includes a rectangular wave generator 11 connected to electrodes 24 and 26. An example of the rectangular wave generator 11 includes a variable forward power supply 12 providing positive or forward voltage 14a to a time switching controller 20, a variable reverse power supply 16 providing negative or reverse voltage 18a to the time switching controller 20, and the time switching controller 20, which generates rectangular power 22a to electrode 24 and rectangular power 23a to electrode 26.

The MRWPC system 10 is designed to precisely adjust times T1 and T2 and reverse polarity between the electrodes 24 and 26 and the power supplies 12 and 16 precisely adjust the voltage of both electrodes 24 and 26. The MRWPC system 10 may include potential measurements comprising feedback signals. The variable forward power supply 12 may receive a feedback signal 14b from the time switching controller 20, the variable reverse power supply 16 may receive a feedback signal 18b from the time switching controller 20, and the time switching controller 20 may receive feedback signals 22b and 23b from electrodes 24 and 26 respectively.

In the case of corrosion control, the cathode is structure negative and the anode is the actual anode. In the case of battery the positive goes to a positive side of the battery which is the cathode, and the negative goes to a negative side of the battery which is the anode. In electroplating the forward positive goes to an anode which is the metal transferred and the negative goes to the subject metal to be plated or formed.

Figure 2:
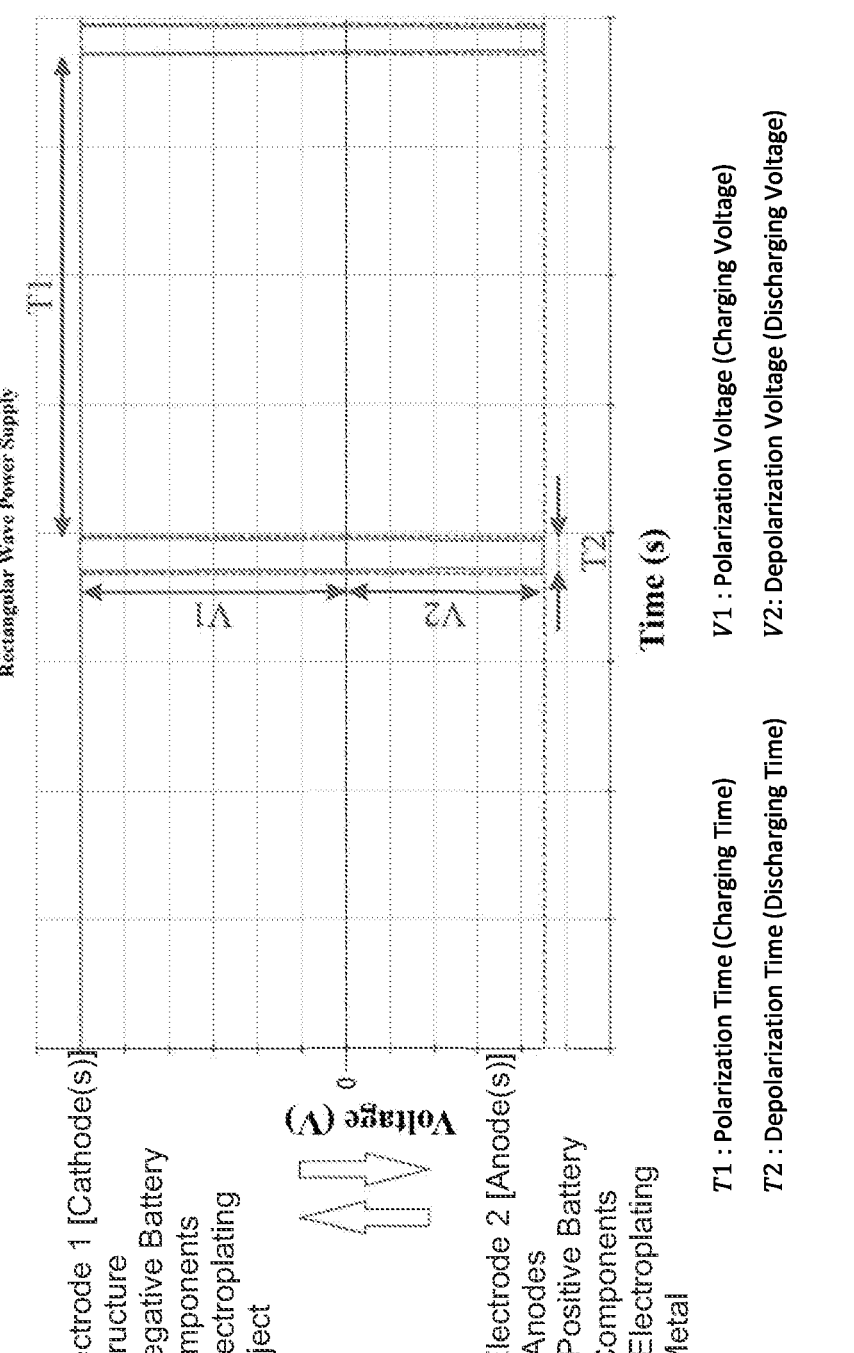
FIG. 2 is a diagram presenting a rectangular waveform generated by the MRWPC system presented in FIG. 1, according to the present invention.

FIG. 2 shows a waveform produced by the MRWPC system 10, comprising a forward or positive voltage (V1) having forward time (T1), and a reverse or negative voltage (V2) having a reverse time (T2). The V1, T1, V2, and T2 are the main adjustable factors in the MRWPC system 10 used to optimize polarization of electrodes in relative electrolytes and to optimize energy consumption and reaction rate. The MRWPC system 10 functions by retaining the polarization level of the electrodes 24 in the beginning stage of concentration polarization. In other words, the MRWPC system 10 maintains a maximum charge of the double layer capacitor formed in the vicinity of the electrode 24 and 26 surfaces.

In the MRWPC system 10, the voltage V1 and the voltage V2 are applied in such a way that the voltage V1 creates a double layer capacitor. The T1 is set to polarize the electrodes 24 and 26, and bring their potential into the ending phase of activation polarization and beginning phase of concentration polarization. The time T2 and the voltage V2 are adjusted so that the electrodes 24 and 26 depolarize close to full capacitance of said double layer capacitor or disturb the concentration of reactant ions around the electrodes.

The MRWPC system 10 may adjust/optimize voltages V1 and V2 and times T1 and T2 to generate the most suitable rectangular wave for polarizing the electrodes to optimize efficiency in different electro chemical applications. The polarization current in the MRWPC system creates a double layer capacitor and the depolarization current reduces or eliminates the concentration polarization effect based on the application. The concentration polarization is a function of the diffusion law and as the electrodes enter into concentration polarization (forming the diffusion layer around the electrodes), the resistance of the electrodes-to-electrolyte interface will increase significantly. To overcome this increased resistance and continue the mass transfer required for cathodic/anodic reactions, more voltage (energy) is required. In other words, the forward or positive voltage V1 charges the double layer capacitor, and the voltage V2 eliminates or reduces the diffusion layer, causing minimal discharge on the capacitor.

Figure 3:
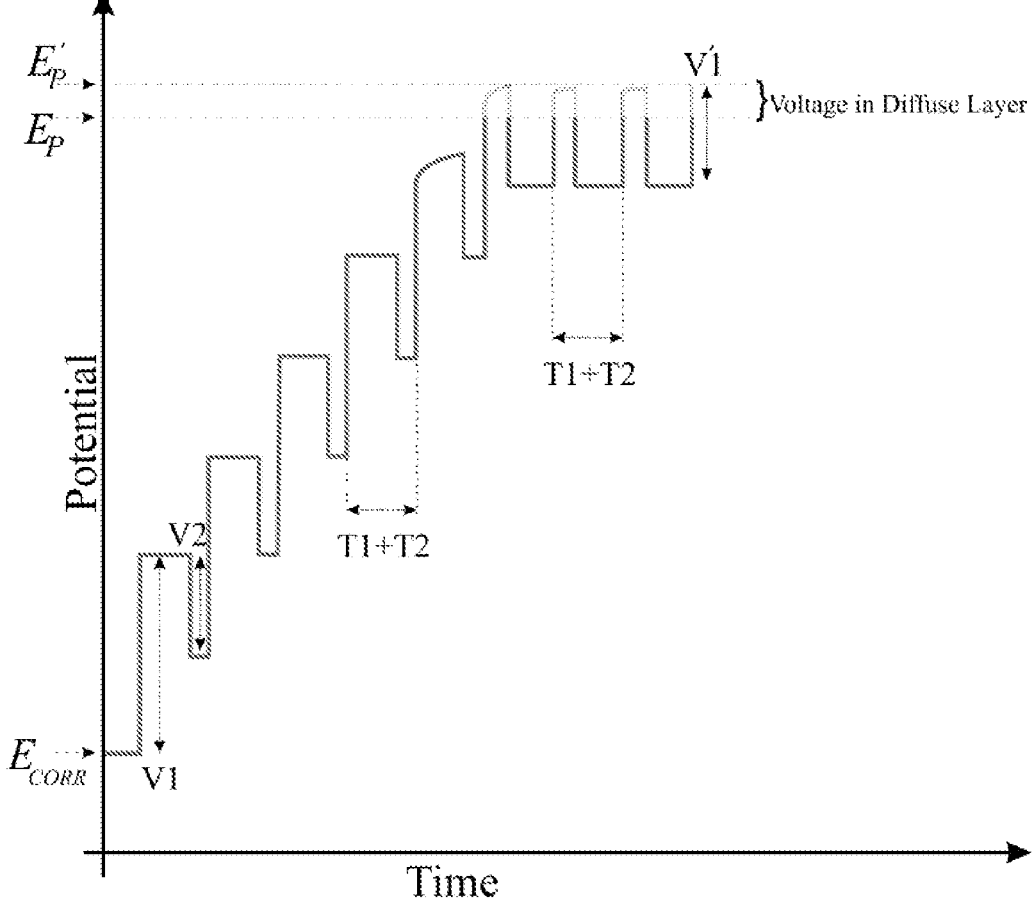
FIG. 3 is diagram presenting changing cathode polarization potential to the electrolyte with respect to time as it relates to the MRWPC system, according to the present invention.

FIG. 3 also illustrates how the MRWPC system 10 rapidly polarizes and stabilizes the structure in a specific potential range just above concentration polarization (Ep E'p). FIG. 3 further illustrates how polarization forms and how it relates the charging of the double layer capacitor.

Figure 4:
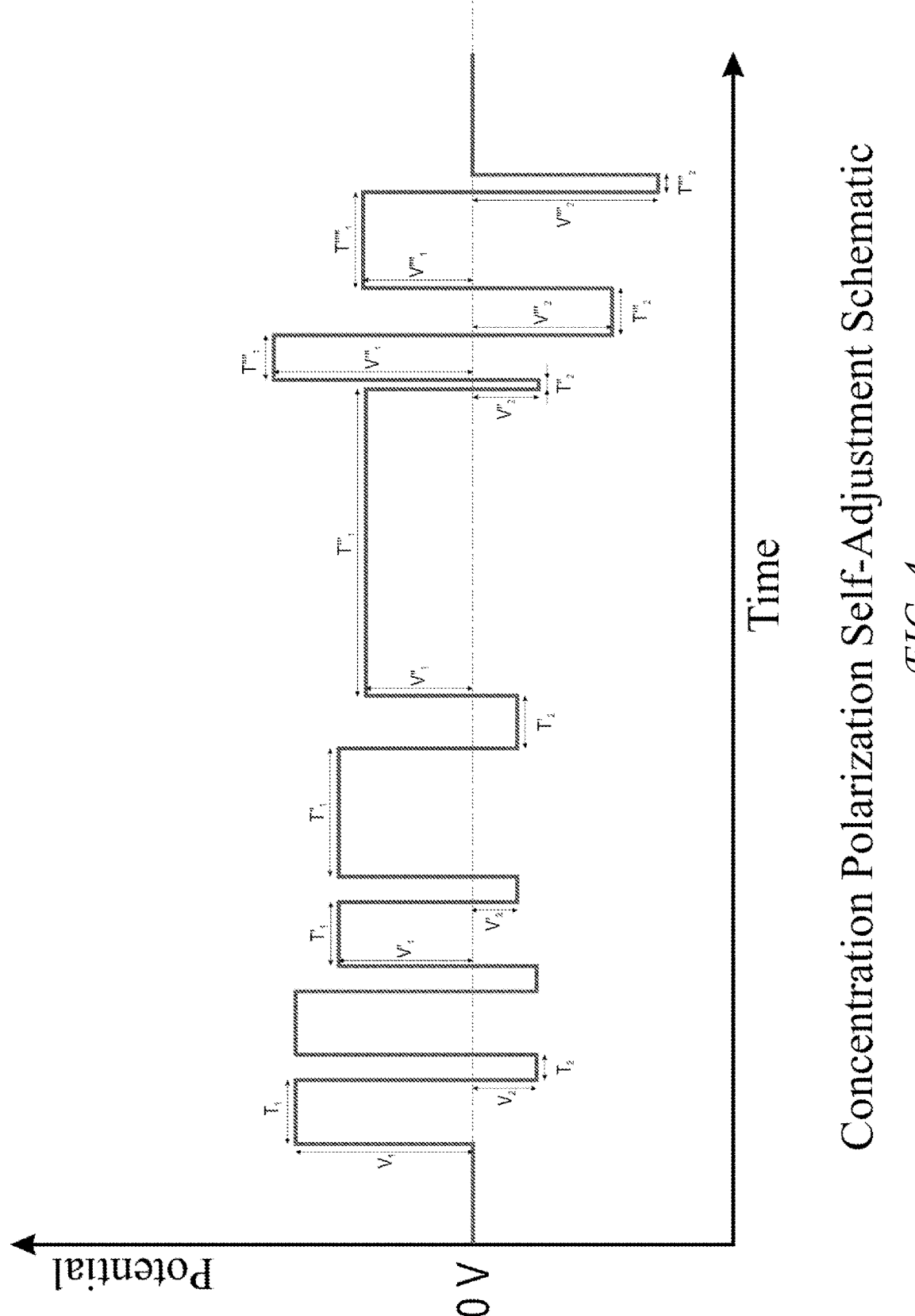
FIG. 4 is a diagram present the schematic of auto adjustment process of the MRWPC system, according to the present invention.

FIG. 4 shows the automatic self adjustment of V1, V2, T1, and T2 during a functional cycle of MRWPC system 10.

In a corrosion control application, the MRWPC system 10 maintains the optimum double layer capacitance around the protected structure.

A higher forward or positive voltage V1 and lower reverse or negative time T2 accelerates polarization of the respective electrode. The reverse or negative voltage V2 eliminates or reduces the concentration of the ions, therefore eliminates or reduces the concentration polarization. Proper timing maintains the polarization in the early stage of concentration polarization and final stage of activation polarization.

While the invention herein disclosed has been described by means of specific embodiments and applications thereof, numerous modifications and variations could be made thereto by those skilled in the art without departing from the scope of the invention set forth in the claims.

We claim:

1. A Modified Rectangular Wave Polarization Control (MRWPC) system, comprising:

a rectangular wave generator producing rectangular waves comprising forward or positive voltage V1 for a forward time T1 and a negative or reverse voltage V2 for a reverse time T2 where at any given time the polarity of each electrode is opposite with potentials of dissimilar magnitude with respect to an electrolyte, which will self-adjust utilizing individually controlled power supplies generating forward and reverse switching voltages that are independently adjusted and are impressed toward the electrodes with different forward and reverse time intervals controlled by a self-adjusting timing switch to regulate the electrical charge on each electrode in order to achieve the required degree of polarization on each electrode; and electrical cables electrically connecting the rectangular wave generator to electrodes cooperating with a subject selected from the group consisting of structures, rechargeable batteries, electroplating baths, electroforming baths, and the electrical cables introducing the rectangular waves to the electrodes.

2. The MRWPC system of claim 1, wherein the subject is the structure and the MRWPC system reduces corrosion of the structure.

3. The MRWPC system of claim 1, wherein the rechargeable battery is the subject and the MRWPC system rejuvenates or rapidly charges the rechargeable battery.

4. The MRWPC system of claim 1, wherein the electroplating bath is the subject and the MRWPC system will enhance the electroplating process by accelerating the processes and improving manageability of metal layer formation.

5. The MRWPC system of claim 1, wherein the electroforming bath is the subject and the MRWPC system will enhance the electroforming process by accelerating the processes and improving manageability of metal layer formation.

6. The MRWPC system of claim 1, wherein V1, T1, V2, and T2 provide the rectangular wave.

7. The MRWPC system of claim 1, wherein V1, T1, V2, and T2 are selected to optimize polarization of electrodes in relative electrolytes and to minimize energy consumption.

8. The MRWPC system of claim 1, wherein V1, T1, V2, and T2 are selected to retain the polarization level of the electrodes in the beginning stage of concentration polarization.

9. The MRWPC system of claim 1, wherein the V1 and V2 and T1 and T2 are automatically adjusted to generate the most suitable rectangular wave for polarizing the electrodes to optimize efficiency in different electrolytes or applications.

10. The MRWPC system of claim 9, wherein:

the V1 and V2 and T1 and T2 are automatically adjusted based on feedback received from the electrodes; and the feedback used to optimize the rectangular wave controlling polarization improving the electrochemical reaction.

11. The MRWPC system of claim 9, wherein the V1 and V2 and T1 and T2 are adjusted using voltage measurements to a reference electrode in corrosion control, interrupting the charging process of the rechargeable battery and measuring the gained voltage and surface voltage feedback during an electroplating or electroforming process.

12. The MRWPC system of claim 1, wherein the rectangular wave generator comprises:

a variable forward power supply providing the forward voltage;

a variable reverse power supply providing the reverse voltage; and a time switching controller generating a forward or positive rectangular power to a first electrode and negative or reverse rectangular power to a second electrode, the rectangular power conversely switching between the electrodes.

13. A Modified Rectangular Wave Polarization Control (MRWPC) system, comprising:

a rectangular wave generator comprising:

a variable forward power supply providing a forward voltage;

a variable reverse power supply providing a reverse voltage; and a time switching controller generating rectangular power from the forward voltage to a first electrode and rectangular power from the reverse voltage to a second electrode, the forward voltage and the reverse voltage conversely switching between the electrodes; and electrical cables electrically connecting the rectangular wave generator to electrodes cooperating with a subject selected from the group consisting of structures, rechargeable batteries, electroplating baths, electroforming baths, and the electrical cables introducing the rectangular waves to the electrodes.

14. A Modified Rectangular Wave Polarization Control (MRWPC) system, comprising:

a rectangular wave generator comprising:

a variable forward power supply providing a forward voltage;

a variable reverse power supply providing a reverse voltage; and a time switching controller generating rectangular power from the 6 forward voltage to a first electrode and rectangular power from the reverse voltage to a second electrode, the forward voltage and the reverse voltage conversely switching between the electrodes; and electrical cables electrically connecting the rectangular wave generator to electrodes cooperating with a structure, and the electrical cables introducing the rectangular waves to the electrodes.

\* \* \* \* \*